United States Patent
Dietz et al.

(10) Patent No.: US 6,868,264 B2
(45) Date of Patent: Mar. 15, 2005

(54) METHOD AND APPARATUS FOR MANAGING AUDIO BROADCASTS IN AN AUTOMOBILE

(75) Inventors: Timothy Alan Dietz, Austin, TX (US); Walid Kobrosly, Round Rock, TX (US); Nadeem Malik, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 530 days.

(21) Appl. No.: 10/015,236

(22) Filed: Dec. 13, 2001

(65) Prior Publication Data

US 2003/0114136 A1 Jun. 19, 2003

(51) Int. Cl.$^7$ ................................................ H04Q 7/20
(52) U.S. Cl. .................................... 455/403; 455/422.1
(58) Field of Search ............................ 455/403, 404.1, 455/412.2, 3.06, 66.1, 74, 557, 184.1, 185.1, 186.1, 45, 450; 348/14.03, 14.04, 14.05, 14.01, 14.02, 14.06

(56) References Cited

U.S. PATENT DOCUMENTS

| 4,268,724 A | * | 5/1981 | Hubbard ........................ 369/7 |
| 6,115,596 A | * | 9/2000 | Raith et al. .............. 455/404.2 |
| 6,349,410 B1 | * | 2/2002 | Lortz ......................... 725/110 |
| 6,434,362 B1 | * | 8/2002 | Schier ......................... 455/45 |
| 6,442,390 B1 | * | 8/2002 | Sano ........................... 455/450 |
| 2002/0136384 A1 | * | 9/2002 | McCormack et al. .. 379/215.01 |
| 2003/0158741 A1 | * | 8/2003 | Nakano ...................... 704/503 |

* cited by examiner

*Primary Examiner*—David Hudspeth
*Assistant Examiner*—Huy D Nguyen
(74) *Attorney, Agent, or Firm*—Duke W. Yee; Mark E. McBurney; Peter B. Manzo

(57) ABSTRACT

A method, apparatus, and computer instructions for controlling presentation of an audio broadcast. Presentation of the audio broadcast is ceased in response to detecting a mobile phone call. The audio broadcast is recorded to form recorded audio presentation data in response to detecting the mobile phone call. The recorded audio presentation data is presented when the mobile phone call ends.

14 Claims, 3 Drawing Sheets

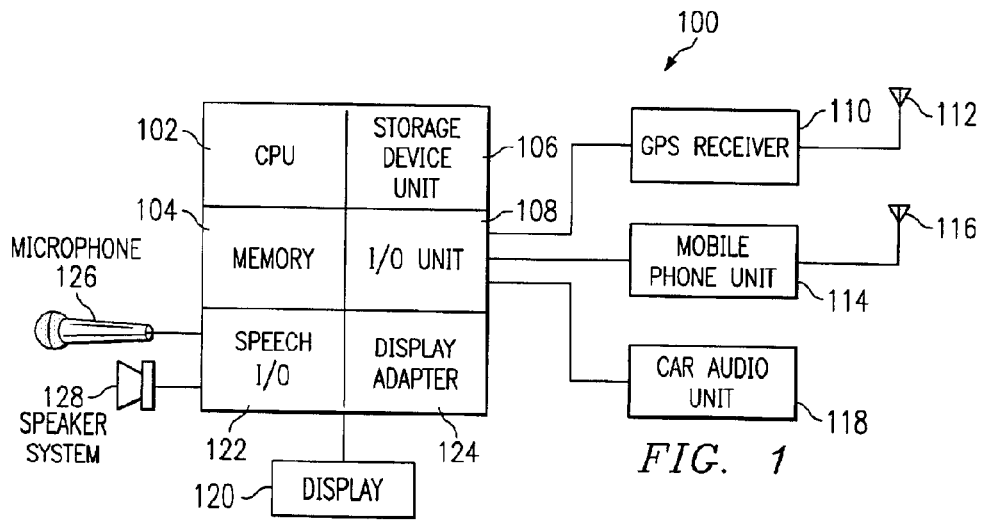
FIG. 1
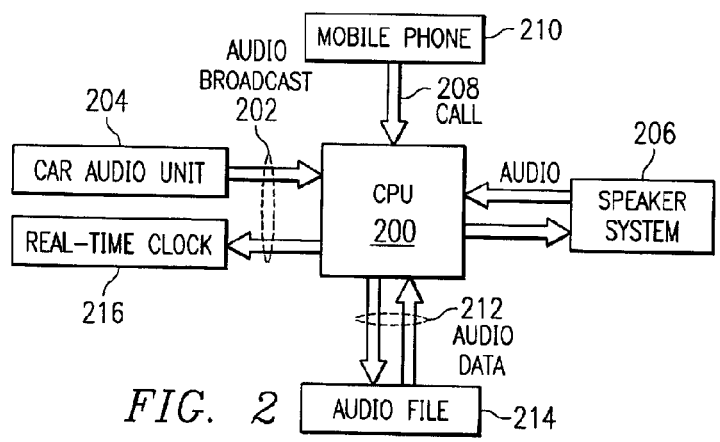
FIG. 2
| | | | |
|---|---|---|---|
| 302— T | 318 | T | 320 |
| 306— T | 322 | 308— T | 324 |
| 310— T | 326 | T —312 | 328 |
| 314— T | 330 | 316— T | 332 |
FIG. 3

METHOD AND APPARATUS FOR MANAGING AUDIO BROADCASTS IN AN AUTOMOBILE

BACKGROUND OF THE INVENTION

1. Technical Field

The present invention relates generally to an improved data processing system, and in particular, to a method and apparatus for managing audio broadcasts in an automobile.

2. Description of Related Art

The use of computers has become more and more pervasive in society. This pervasiveness includes the integration of computers into vehicles. The utilization of computer technology is employed to provide users or drivers with a familiar environment. In this manner, a user's ability to easily use computing resources in an automobile is provided. Various platforms have been developed and are being developed for use in automobiles. Many platforms provide the computing strength of a personal computer platform with widely recognized as well as emerging technologies.

Widely accepted technologies that may be implemented within an automobile include, cellular/global system for mobile communications (GSM), global positioning system (GPS), and radio data broadcast (RDB). These devices allow a driver to navigate, receive real-time traffic information and weather forecasts, access databases of personalized information, and place and receive telephone calls from an automobile. Emerging technologies that are being integrated into computing platforms for automobiles include the universal serial bus (USB) and the digital video disk (DVD).

It is not uncommon for a driver of an automobile to listen to an audio broadcast, such as a news program, and receive a mobile phone call. Many automobiles, which include integration for mobile telephones, include a feature in which the level at which the audio broadcast is presented to the driver is reduced or muted when a call is received. Currently, the driver must decide whether to answer the call and possibly miss important information in the audio broadcast or to ignore the call.

Therefore, it would be advantageous to have an improved method and apparatus for managing audio broadcasts.

SUMMARY OF THE INVENTION

The present invention provides a method, apparatus, and computer instructions for controlling presentation of an audio broadcast. Presentation of the audio broadcast is ceased in response to detecting a mobile phone call. The audio broadcast is recorded to form recorded audio presentation data in response to detecting the mobile phone call. The recorded audio presentation data is presented when the mobile phone call ends.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a block diagram of an automotive computing platform in accordance with a preferred embodiment of the present invention;

FIG. 2 is a diagram illustrating data flow in managing audio broadcasts in accordance with a preferred embodiment of the present invention;

FIG. 3 is a diagram illustrating audio data in accordance with a preferred embodiment of the present invention;

DETAILED DESCRIPTION OF THE PREFERRED EMBODIMENT

Figure 4:
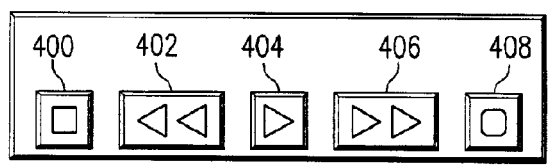
FIG. 4 is a diagram illustrating audio controls in accordance with a preferred embodiment of the present invention.

Turning now to FIG. 1, a block diagram of an automotive computing platform is depicted in accordance with a preferred embodiment of the present invention. Computing platform 100 is located within a vehicle, such as an automobile or truck. Computing platform 100 includes a CPU 102, which may be an embedded processor or processor such as a Pentium processor from Intel Corporation. "Pentium" is a trademark of Intel Corporation. Computing platform 100 also includes memory 104, which may take the form of random access memory (RAM) and/or read only memory (ROM).

Computing platform 100 also contains a storage device unit 106. Storage device unit 106 may contain one or more storage devices, such as, for example, a hard disk drive, or a flash memory. Computing platform 100 also includes an input/output (I/O) unit 108, which provides connections to various I/O devices. In this example, a GPS receiver 110 is included within computing platform 100 and receives signals through antenna 112. Communications are provided through antenna 116. In addition, car audio unit 118 is connected to I/O unit 108.

Computing platform 100 also includes a display adapter 124, which is connected to display 120. In the depicted example, this display is a touch screen display. Alternatively, or in addition to a touch screen display, display 120 also may employ a heads-up display projected onto the windshield of the automobile. Computing unit 100 also includes microphone 126 and speaker system 128 to provide a driver with an ability to enter commands and receive responses through speech I/O 122 without having to divert the driver's attention away from the road, or without the driver having to remove the driver's hands from the steering wheel. In these examples, car audio unit 118 presents broadcasts through speaker system 128. This same speaker is used to listen to phone calls received through mobile phone unit 114.

The illustration of computing unit 100 in FIG. 1 is not intended as an architectural limitation to the present invention, but is an example of one system in which the present invention may be implemented. For example, a computing unit for an automobile may not require a GPS receiver or speech I/O unit to implement the mechanisms of the present invention. Further, in these examples mobile phone unit 114 and car audio unit 118 both use speaker system 128. Alternatively, different speaker systems may be provided for these two units.

In particular, the present invention provides a method, apparatus, and computer instructions for controlling a live broadcast or audio feed being received by the computing unit. The mechanism of the present invention will store or record an audio broadcast when a mobile phone call is received. The audio broadcast is muted or interrupted when the call occurs. When the call is completed, the driver may begin listening to the audio feed at the point at which the interruption occurred.

Turning next to FIG. 2, a diagram illustrating data flow in managing audio broadcasts is depicted in accordance with a preferred embodiment of the present invention. This example illustrates components in a computing unit used to manage the presentation of audio broadcasts and the reception of mobile phone calls.

In this example, CPU 200 controls the presentation of audio broadcast 202 from car audio unit 204 through speaker system 206. Car audio unit 204 and speaker system 206 may be implemented as car audio unit 118 and speaker system 128 in FIG. 1. Additionally, CPU 200 also is used to control the presentation of call 208 from mobile phone 210 on speaker system 206. In this example, CPU 200 may be implemented as CPU 102 in FIG. 1. However, other types of controllers other than a processor may be used depending on the particular implementation. For example, another type of controller is an application specific integrated circuit.

A broadcast is received by car audio unit 204 and presented on speaker system 206 through CPU 200. When a call is received by mobile phone 210, the presentation of audio broadcast 202 is interrupted, but is not lost. CPU 200 generates audio data 212, which is stored in audio file 214. This audio file is stored in a storage device, such as storage device unit 106 in FIG. 1. This storage device also may be an embedded storage device. In addition, time stamp data is stored within audio file 214 for use in synchronizing the stored data with the live broadcast at a later time. The time stamps are generated using real-time clock 216. In this example, real-time clock 216 is located within the automobile but may be obtained from an external source, such as a radio signal received by audio broadcast 202.

After the call is completed, audio data 212 is then presented through speaker system 206 by CPU 200. Audio data 212 may be presented through speaker system 206 automatically after the call has completed. Alternatively, the user may initiate the presentation of this data.

While the presentation of audio data 212 is being made through speaker system 206, audio broadcast 202 continues to be stored in audio file 214 until the recorded data is synchronized to the live or real-time stream of data in the audio broadcast. The recorded data is synchronized to the live broadcast when the data being presented matches the live broadcast. This event or state may be determined using time stamps that are associated with the recorded data. This synchronization is identified by comparing time stamps stored in audio file 214 to the current time, provided by real-time clock 216. When audio broadcast 202 is synchronized with audio data 212 then CPU 200 switches to presenting audio broadcast 202 through speaker system 206 and ceases generating audio data 212 from audio broadcast 202. CPU 200 also allows a user to manipulate the presentation of audio data 212 through various functions, such as reverse, fast forward, or allowing the user to skip commercials.

Additionally, CPU 200 also may allow manual interruption of the presentation of audio broadcast 202 in which audio data 212 is generated for later play back. A function, such as a record button may be used to allow the manual interruption when the user is preoccupied. Additionally, CPU 200 may continue to present audio broadcast 202 in addition to generation of audio data 212 to allow later play back of selected audio broadcast 202. In this example, car audio unit 204 and mobile phone 210 share speaker system 206 with CPU 200 controlling the presentation of audio information.

With reference now to FIG. 3, a diagram illustrating audio data is depicted in accordance with a preferred embodiment of the present invention. File 300 is an example of audio data stored in an audio file, such as audio file 214 in FIG. 2. In this example, time stamps 302–316 are stored in association with audio data 318–332. When the audio data is replayed, these time stamps are examined and compared to the current time to determine whether the presentation of audio data is synchronized with the current audio broadcast.

Turning now to FIG. 4, a diagram illustrating audio controls is depicted in accordance with a preferred embodiment of the present invention. In this example, the audio controls include stop button 400, rewind button 402, play button 404, fast forward button 406, and record button 408. Play button 404 allows audio data to be played. Rewind button 402 and fast forward button 406 allow the user to replay or fast forward through the audio data. Additionally, fast forward button 406 may provide a second function in which commercials are skipped. This second function may be initiated by pressing another key, such as play button 404, in conjunction with fast forward button 406. In this example, record button 408 allows for the manual recording of the audio data as described above. Stop button 400 may be used to stop playback or recording of the audio data.

In this example, these buttons may be physical controls in a radio unit or may be presented through a graphical user interface, such as display 120 in FIG. 1.

Figure 5:
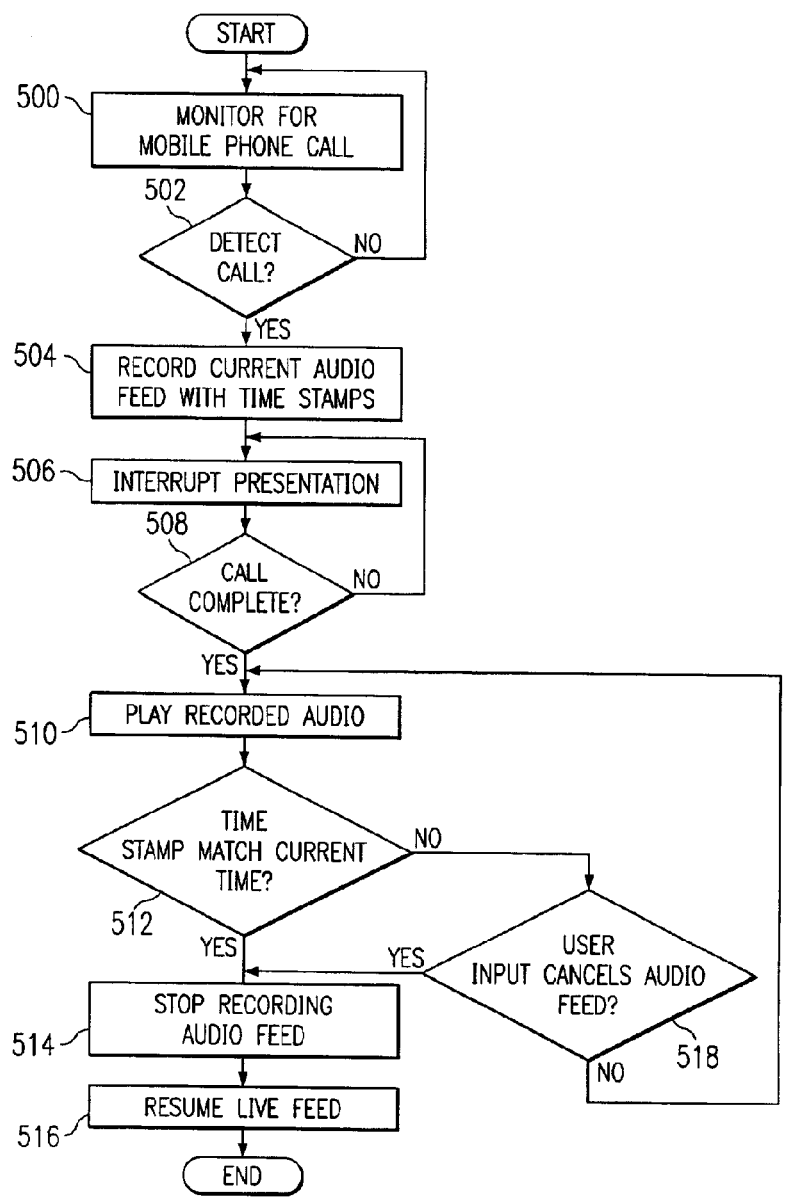
FIG. 5 is a flowchart of a process used for managing presentation of an audio broadcast in accordance with a preferred embodiment of the present invention.

With reference now to FIG. 5, a flowchart of a process used for managing presentation of an audio broadcast is depicted in accordance with a preferred embodiment of the present invention. The process illustrated in FIG. 5 may be implemented in a CPU, such as CPU 200 in FIG. 2.

The process begins by monitoring for a mobile phone call (step 500). Next, a determination is made as to whether a call is detected (step 502). If a call is detected, the current audio feed is recorded with time stamps (step 504). The time stamps are generated using a real-time clock in these examples. The presentation of the audio broadcast is interrupted to allow for presentation of the call (step 506). Steps 504 and 506 occur simultaneously in these examples. A determination is made as to whether the call is complete (step 508). If the call is complete, the recorded audio is played (step 510). In this example, the recorded audio is automatically played after the call completes. However, depending on the implementation or user preferences, the recorded audio may be played in response to a user input.

Next, a determination is made as to whether the time stamp matches the current time (step 512). If the time stamp does match the current time, the audio feed is no longer recorded (step 514). The live feed is resumed (step 516) with the process terminating thereafter.

Returning to step 512, if the time stamp does not match the current time, a determination is made as to whether the user input cancels the audio feed (step 518).

If the user input cancels the audio feed, the process proceeds to step 514 as described above. If the user input does not cancel the audio feed, the process returns to step 510 as described above.

With reference again to step 508, if the call is not complete, the process returns to step 506 as described above.

Figure 6:
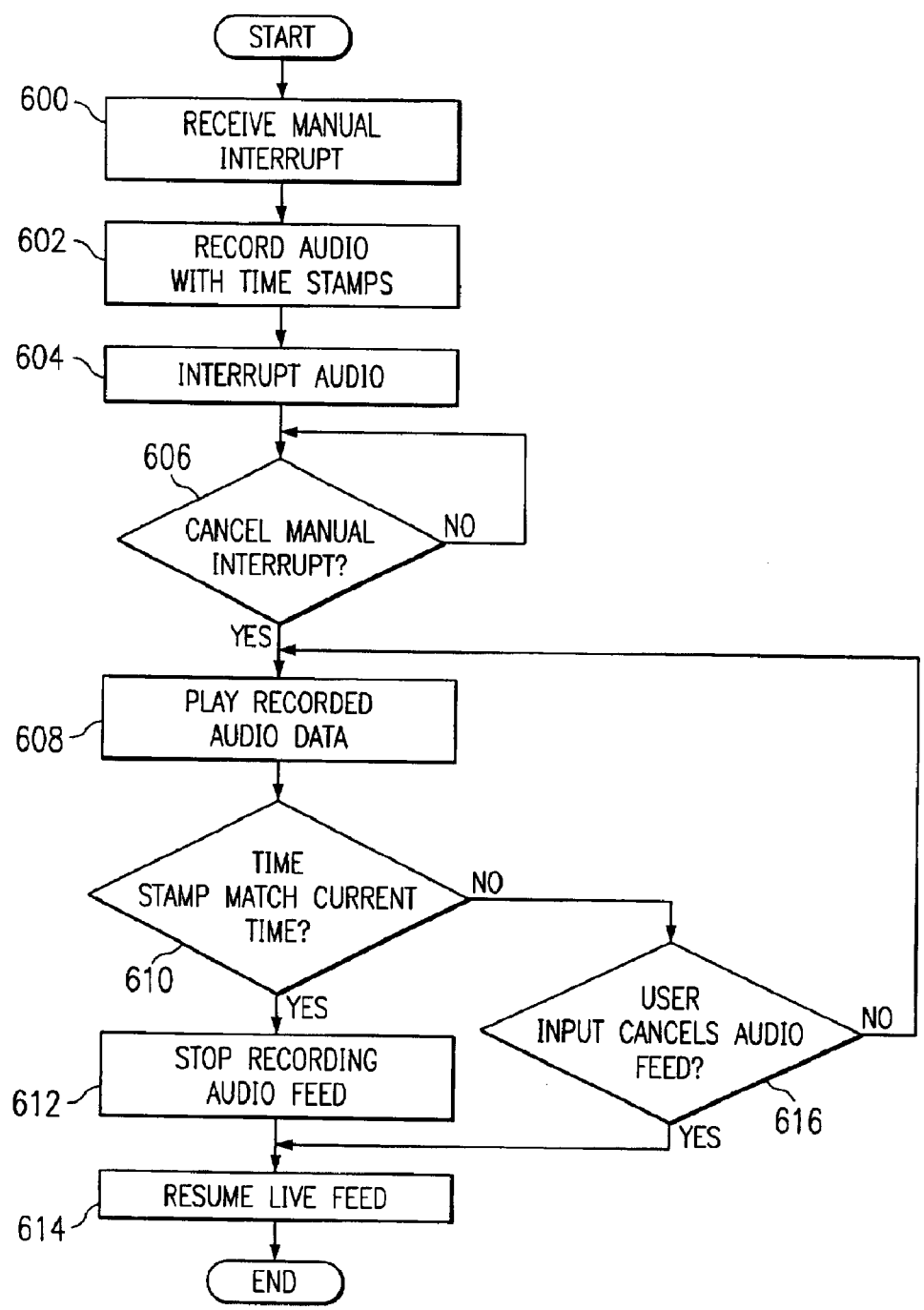
FIG. 6 is a flowchart of a process used for manually interrupting an audio broadcast in accordance with a preferred embodiment of the present invention.

Turning next to FIG. 6, a flowchart of a process used for manually interrupting an audio broadcast is depicted in accordance with a preferred embodiment of the present invention. The process illustrated in FIG. 6 may be implemented in a CPU, such as CPU 200 in FIG. 2.

The process begins by receiving a manual interrupt command (step 600). After receiving the manual interrupt command, the audio is recorded with time stamps (step 602). The audio is interrupted (step 604). Step 602 and step 604 basically occur at the same time. Next, a determination is made as to whether a command to cancel the manual interrupt has been received (step 606). The manual interrupt may be cancelled by a user input, such as the selection of a stop button. If the manual interrupt is not cancelled, the process continues to return to step 606.

Upon receiving a command to cancel the manual interrupt, the recorded audio data is played (step 608). In this example, the audio data is played after the stop button is pressed. Alternatively, the audio data may be presented in response to another user input, such as the selection of a play button.

A determination is then made as to whether the time stamp matches the current time (step 610). If the time stamp matches the current time, the audio feed stops recording (step 612). The live feed is then resumed (step 614) with the process terminating thereafter.

Turning again to step 610, if the time stamp does not match the current time, a determination is made as to whether a user input is received that cancels the audio feed (step 616). This cancellation is the selection of the stop button in these examples. If the user input cancels the audio feed, the process proceeds to step 614 as described above. If the user input does not cancel the audio feed, the process returns to step 608 as described above.

Thus, the present invention provides an improved method, apparatus, and computer instructions for managing presentation of audio broadcasts and mobile phone calls. The mechanism of the present invention allows for a user to receive a mobile phone call while a broadcast is occurring. Upon receipt of the call, the presentation of the broadcast is interrupted to allow the mobile phone call to be presented. To prevent the user from missing the broadcast that occurs while the mobile phone call is in progress, the broadcast is recorded. This recorded broadcast is replayed to the user after the mobile phone call terminates. The real-time stream of the audio broadcast is presented to the user when that data is synchronized with the data stored from the broadcast. This synchronization is performed in these examples using time stamps. Thus, with this mechanism, the user does not have to miss an audio broadcast to answer a mobile phone call. With a manual interrupt, as described above, the user also may avoid missing audio broadcasts in response to other distractions.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMS, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for controlling presentation of an audio broadcast in an automobile, the method comprising:

in response to detecting a mobile phone call, automatically ceasing presentation of the audio broadcast;

in response to detecting the mobile phone call, automatically recording the audio broadcast to form recorded audio presentation data; and automatically presenting the recorded audio presentation data when the mobile phone call ends.

2. The method of claim 1 further comprising:

ceasing presentation of the recorded audio presentation data and presenting the audio broadcast when the recorded audio presentation data is synchronized with the audio broadcast.

3. The method of claim 1, wherein the audio broadcast includes time stamp data and further comprising:

comparing the time stamp data to a current time;

responsive to the time stamp data, associated with the audio presentation data being presented, matching the current time, and ceasing presentation of the audio presentation data; and responsive to the time stamp data, associated with the audio presentation data being presented, matching the current time, and resuming presentation of the audio broadcast.

4. The method of claim 1, wherein the presentation of the audio broadcast data is manipulated by commands including at least one of a fast forward and a reverse.

5. The method of claim 1, wherein the presentation of the audio broadcast data is manipulated to skip commercials within the recorded audio data.

6. The method of claim 1, wherein the data processing system is located in an automobile.

7. A data processing system for controlling presentation of an audio broadcast in an automobile, the data processing system comprising:

a bus system;

a communications unit connected to the bus system;

a memory connected to the bus system, wherein the memory includes a set of instructions; and a processing unit connected to the bus system, wherein the processing unit executes the set of instructions to automatically cease presentation of the audio broadcast in response to detecting a mobile phone call; automatically record the audio broadcast to form recorded audio presentation data in response to detecting the mobile phone call; and automatically present the recorded audio presentation data when the mobile phone call ends.

8. A data processing system for controlling presentation of an audio broadcast in an automobile, the data processing system comprising:

automatically ceasing means, responsive to detecting a mobile phone call, for ceasing presentation of the audio broadcast;

automatically recording means, responsive to detecting the mobile phone call, for recording the audio broadcast to form recorded audio presentation data; and automatically presenting means for presenting the recorded audio presentation data when the mobile phone call ends.

9. The data processing system of claim 8, wherein the ceasing means is a first ceasing means, and further comprising:

second ceasing means for ceasing presentation of the recorded audio presentation data and presenting the audio broadcast when the recorded audio presentation data is synchronized with the audio broadcast.

10. The data processing system of claim 8, wherein the audio broadcast includes time stamp data, wherein the ceasing means is a first ceasing means, and further comprising:

comparing means for comparing the time stamp data to a current time;

second ceasing means, responsive to the time stamp data, associated with the audio presentation data being presented, matching the current time, for ceasing presentation of the audio presentation data; and resuming means, responsive to the time stamp data, associated with the audio presentation data being presented, matching the current time, for resuming presentation of the audio broadcast.

11. The data processing system of claim 8, wherein the presentation of the audio broadcast data is manipulated by commands including at least one of a fast forward and a reverse.

12. The data processing system of claim 8, wherein the presentation of the audio broadcast data is manipulated to skip commercials within the recorded audio data.

13. The data processing system of claim 8, wherein the data processing system is located in an automobile.

14. A computer program product in a computer readable medium for controlling presentation of an audio broadcast in an automobile, the computer program product comprising:

first instructions, responsive to detecting a mobile phone call, for automatically ceasing presentation of the audio broadcast;

second instructions, responsive to detecting the mobile phone call, for automatically recording the audio broadcast to form recorded audio presentation data; and third instructions for automatically presenting the recorded audio presentation data when the mobile phone call ends.

* * * * *